(12) United States Patent
    Ceylan et al.

(10) Patent No.:    US 12,668,208 B2
(45) Date of Patent:    Jun. 30, 2026

(54) METHOD AND APPARATUS FOR DETERMINING A USER PROFILE OF A VEHICLE ON THE BASIS OF ONE OR MORE KEY DEVICES

(71) Applicant: Bayerische Motoren Werke Aktiengesellschaft, Munich (DE)

(72) Inventors: Adem Ceylan, Munich (DE); Alaa Mourad, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 72 days.

(21) Appl. No.: 18/678,597

(22) Filed: May 30, 2024

(65) Prior Publication Data

US 2024/0416866 A1     Dec. 19, 2024

(30) Foreign Application Priority Data

Jun. 16, 2023    (DE)  .................... 10 2023 115 875.9

(51) Int. Cl.
    *B60R 25/00*        (2013.01)
    *B60R 25/24*        (2013.01)

(52) U.S. Cl.
    CPC ........ *B60R 25/24* (2013.01); *B60R 2325/101* (2013.01)

(58) Field of Classification Search
    CPC .. B60R 25/24; B60R 2325/101; B60R 16/037
    See application file for complete search history.

(56) References Cited

U.S. PATENT DOCUMENTS

| | | | | |
|---|---|---|---|---|
| 2014/0310788 A1* | 10/2014 | Ricci | ....................... | H04L 29/06 |
| 2017/0200336 A1* | 7/2017 | Schmidt | ................ | G08C 17/02 |
| 2017/0369071 A1* | 12/2017 | Gould | ..................... | B60R 25/24 |
| 2020/0172052 A1* | 6/2020 | Weston | ............... | G06F 13/4063 |
| 2022/0219642 A1* | 7/2022 | Chen | ....................... | B60R 25/01 |
| 2023/0106867 A1* | 4/2023 | Chan | ....................... | G06F 21/35 |

FOREIGN PATENT DOCUMENTS

| | | | | | |
|---|---|---|---|---|---|
| CN | 115690955 A | * | 2/2023 | .............. | G07C 9/00 |
| DE | 10 2015 223 871 A1 | | 6/2017 | | |
| DE | 102018009787 A1 | * | 6/2020 | .......... | B60R 16/037 |
| DE | 102019132403 A1 | * | 6/2021 | .......... | B60R 16/037 |

OTHER PUBLICATIONS

German-language German Search Report issued in German Application No. 10 2023 115 875.9 dated Feb. 1, 2024, with partial English translation (8 pages).

* cited by examiner

*Primary Examiner* — Russell Frejd
*Assistant Examiner* — Brittany Renee Peko
(74) *Attorney, Agent, or Firm* — Crowell & Moring LLP

(57)          ABSTRACT

An apparatus for operating a vehicle determines whether there is a communication connection to exactly one key device or to a plurality of key devices, each respectively having a digital key for authenticating the respective key device at the vehicle. On the basis of whether there is a communication connection to exactly one key device or to a plurality of key devices, a user profile is adopted for the operation of the vehicle, or the user of the vehicle is made to select a user profile from a set of different user profiles.

10 Claims, 2 Drawing Sheets

METHOD AND APPARATUS FOR DETERMINING A USER PROFILE OF A VEHICLE ON THE BASIS OF ONE OR MORE KEY DEVICES

CROSS REFERENCE TO RELATED APPLICATION

This application claims priority under 35 U.S.C. § 119 from German Patent Application No. DE 10 2023 115 875.9, filed Jun. 16, 2023, the entire disclosure of which is herein expressly incorporated by reference.

BACKGROUND AND SUMMARY

The invention relates to a method and a corresponding apparatus for determining a user profile of a vehicle on the basis of one or more key devices.

A vehicle may have one or more functions that can be remotely controlled by a user of the vehicle using an electronic device, such as a smartphone. An example of a vehicle function is the opening and/or closing of a door or flap of the vehicle and/or the execution of an automated parking operation and/or the adjustment of a vehicle seat. The one or more vehicle functions are typically controlled remotely via a wireless communication connection between the vehicle and the electronic device (e.g., electronic key), while the electronic device is arranged near the vehicle.

The vehicle can be used by different users (e.g. different members of a family, or different employees of a company). Different user profiles can be defined for the different users. The different user profiles can at least partially define different settings of one or more components (e.g. for a vehicle seat, for an infotainment system, for an air conditioning system, etc.) of the vehicle.

The present document deals with the technical object of increasing the convenience of using a vehicle by a plurality of users in an efficient and reliable manner.

The object is achieved, inter alia, by each of the independent claims. Advantageous embodiments are described, inter alia, in the dependent claims. It is pointed out that additional features of a patent claim dependent on an independent patent claim, without the features of the independent patent claim or in combination only with a subset of the features of the independent patent claim, may form a standalone invention that is independent of the combination of all of the features of the independent patent claim and may be made into the subject matter of an independent claim, a divisional application or a subsequent application. This applies in the same way to technical teachings that are described in the description and may form an invention independent of the features of the independent patent claims.

One aspect describes an apparatus for operating a vehicle, which may be a motor vehicle. The apparatus may in particular be designed to operate one or more functions of the vehicle, in particular to control one or more functions of the vehicle, preferably remotely. Some examples of functions that may be controlled are:

- the automatic adjustment of one or more seats of the vehicle (e.g. one or more front seats in a front row of seats and/or one or more rear seats in a rear row of seats);
- integration of a key device (such as a mobile user device, such as a smartphone) of a user into an infotainment system of the vehicle;
- unlocking of one or more doors or flaps of the vehicle; and/or

- automatic adjustment of an air conditioning system and/or a seat heating system of the vehicle.

The apparatus is configured to determine whether there is a communication connection, in particular an authenticated communication connection, (either) to exactly one key device or (alternatively) to a plurality of key devices. The individual key devices may each have a digital key for authenticating the respective key device at the vehicle. The individual communication connections between the vehicle and the individual one or more key devices may each include a Bluetooth Low Energy, BLE, and/or an Ultra-wideband, UWB, communication connection. The individual digital keys may each be designed in accordance with the Car Connectivity Consortium, CCC, key standard, in particular in accordance with CCC Release 3.

Typically, a dedicated communication connection between the vehicle and the respective key device is provided for each key device. If it is determined that there is a communication connection (of the vehicle) to a plurality of key devices, this means that there is a dedicated communication connection for each of the key devices. This means that, for K key devices, there are K corresponding communication connections between the vehicle and the respective key device, with $K \geq 1$.

The individual (authenticated) communication connections between the vehicle and the individual key devices may each have been set up taking into account the digital key of the respective key device.

The apparatus may in particular be configured to receive and verify the digital key of a key device (via a non-authenticated (BLE) communication connection). A communication connection, in particular an authenticated communication connection, can be set up to the key device when the digital key of the key device has been successfully verified. On the other hand, a communication connection, in particular an authenticated communication connection, to the key device can be prevented when the digital key of the key device has not been successfully verified.

The presence of an (authenticated) communication connection between the vehicle and a key device may allow the key device to (remotely) control one or more functions of the vehicle. On the other hand, (remote) control by the key device is typically not possible if there is no (authenticated) communication connection between the vehicle and the key device.

It can thus be determined whether exactly one (authorized and/or authenticated) key device (and a corresponding user) or whether a plurality of (authorized and/or authenticated) key devices (and corresponding users) is/are arranged in the surroundings of the vehicle or in the vehicle.

The apparatus may also be configured to operate the vehicle, in particular at least one function of the vehicle, on the basis of whether there is a communication connection to exactly one key device or (alternatively) to a plurality of key devices. It is therefore possible to adjust the operation of the vehicle (in particular of the at least one function of the vehicle) on the basis of whether there is a communication connection to exactly one key device or whether alternatively there are a plurality of communication connections to a plurality of key devices. This allows particularly convenient use of the vehicle by a plurality of users.

The apparatus is in particular configured, on the basis of whether there is a communication connection to exactly one key device or to a plurality of key devices, to automatically adopt a user profile for the operation of the vehicle (without a user profile being previously selected by a user of the vehicle) or to have a user of the vehicle select a user profile from a set of different user profiles (in order to determine the user profile for the operation of the vehicle). In particular, if there is a communication connection to a plurality of key devices, it is possible to have a user of the vehicle select a user profile from a set of different user profiles. On the other hand, if there is a communication connection to exactly one key device, it is possible to automatically adopt a user profile for the operation of the vehicle. The user profile associated with the key device for which there is a communication connection can be used directly (without a previous selection by the user of the vehicle).

The individual key devices can each be associated with a user profile (e.g. in each case specific to the user of the respective key device). The individual user profiles can each comprise one or more user-specific settings for a vehicle seat;

one or more user-specific settings for an air conditioning system and/or a seat heating system;

one or more user-specific settings for an infotainment system; and/or one or more user-specific settings for illumination of the vehicle.

If it is detected that there is only a single communication connection to exactly one key device, the user profile associated with this key device can be used automatically to automatically effect a user-specific adjustment of the vehicle. On the other hand, if there are communication connections to a plurality of key devices, it may be possible to select a user profile from the set of user profiles (e.g. via the user interface of the vehicle), wherein the set of user profiles includes exactly the user profiles associated with the plurality of key devices.

A user-specific adjustment of the vehicle can thus be achieved in a particularly convenient and reliable manner.

The apparatus can thus be configured, if there is a communication connection to a plurality of key devices, to determine, for the individual key devices, a respective user profile associated with the respective key device in order to determine the set of user profiles. It may then be possible for the user of the vehicle to select a user profile from this set of user profiles in order to operate and/or adjust the vehicle according to the selected user profile.

The apparatus may be configured to output the set of user profiles in the form of a (possibly sorted) list via a user interface (of the vehicle), in particular to display it (e.g. in each case exactly one user profile for each line of the list). In addition, a selection of one of the user profiles from the list of user profiles can be captured via the user interface, and the vehicle can be operated with the selected user profile. This allows a particularly convenient use of the vehicle by a plurality of different users.

For the individual key devices, the distance between the respective key device and a reference position, in particular the driver's position, of the vehicle can be respectively determined (based on the respective communication connection). It is then possible to have the user of the vehicle select a user profile from the set of different user profiles, which selection depends on the determined distances between the individual key devices and the reference position. In particular, the individual user profiles within the list (output via the user interface) can be sorted on the basis of the distance between the key device associated with the respective user profile and the reference position, for instance such that the user profile associated with the key device that is at the relatively shortest distance from the reference position is arranged at the top of the list.

The convenience of a user-specific adjustment of the vehicle can be further increased by outputting a list of user profiles sorted on the basis of the distances of the key devices associated with the user profiles.

The vehicle can comprise a plurality of different zones, in particular seating positions, which can each be adjusted in a user-specific manner by a user profile. The apparatus may be configured to determine position information relating to the position of the key device within the vehicle by means of the communication connection to a key device. It is then possible to select exactly one of the different zones on the basis of the position information, and the selected zone can be adjusted in a user-specific manner according to the user profile associated with the key device. A user profile for one or more further zones can be selected accordingly in each case (on the basis of position information for a key device in each case). This allows a particularly convenient, user-specific adjustment of the vehicle to be achieved.

The apparatus may be configured to determine the (exact) number of key devices, to each of which there is an (authenticated, BLE and/or UWB) communication connection. The vehicle, in particular the at least one function of the vehicle, can then be operated in a particularly convenient manner on the basis of the determined number of key devices. In other words, the operation of the vehicle, in particular the operation of the at least one function of the vehicle, can be adjusted to the determined number of key devices (for each of which there is a communication connection to the vehicle).

The apparatus may be configured to determine whether or not there is a respective communication connection to more than N (e.g. N=2) key devices. One or more front seats (in particular the driver's seat and/or the front passenger's seat) of the vehicle can be adjusted automatically (while the one or more key devices approach the vehicle) on the basis of whether or not there is a respective communication connection to more than N key devices. The one or more front seats may be adjusted automatically in particular in such a way that the one or more front seats are positioned further forward when there are communication connections to more than N key devices (and it is expected that one or more users will also be seated on one or more rear seats of the vehicle) than when there are one or more communication connections to N key devices or fewer. The convenience of the vehicle users can thus be increased to a particular extent.

The apparatus may be configured to prevent an output of information from a first key device (e.g. information relating to a telephone call on the first key device) via a user interface of the vehicle if, in addition to the first key device, there is a respective communication connection to one or more further key devices. On the other hand, the output of the information from the first key device can be effected via the user interface of the vehicle if, in addition to the first key device, there is no communication connection to a further key device. This can increase the convenience (especially in terms of protecting confidential information) of the user of the first key device.

The apparatus may be configured to use the communication connection to a first key device to determine direction and/or position information in relation to the position at which the first key device is arranged and/or in relation to the direction from which the first key device approaches the vehicle. The direction and/or position information can possibly be respectively determined for all key devices, for each of which there is an (authenticated) communication connection.

The vehicle, in particular the at least one function of the vehicle, can then be operated in a particularly convenient manner on the basis of the direction and/or position information (relating to the first key device and/or the key devices, to which there is a communication connection).

The apparatus may be configured to determine that there are communication connections, in particular authenticated communication connections, to a plurality of key devices. It is then possible to determine priority information with respect to the relative priority of the different key devices with respect to each other. The priority information can be determined on the basis of the digital keys of the individual key devices. For example, the digital keys for the different key devices may have different priorities.

The vehicle, in particular the at least one function of the vehicle, can then be operated in a particularly convenient manner on the basis of the priority information.

The apparatus may be configured, for example, to identify, on the basis of the priority information, a first key device, in particular as the key device with the highest relative priority from the plurality of key devices. The vehicle, in particular the at least one function of the vehicle, can then be operated on the basis of the first key device, in particular on the basis of the direction and/or position information for the first key device, and/or on the basis of a control command of the first key device for controlling the at least one function. The convenience of vehicle use by different users can be increased further by taking into account the priorities of different key devices.

Another aspect describes a (road) motor vehicle (in particular a passenger vehicle or a commercial vehicle or a bus or a motorcycle) that comprises the apparatus described in this document.

One aspect describes a method for operating a (motor) vehicle. The method comprises determining whether there is a respective (BLE and/or UWB) communication connection, in particular an authenticated (BLE and/or UWB) communication connection, to exactly one key device or to a plurality of key devices. In other words, it can be determined whether there is exactly one communication connection between the vehicle and a key device, or whether there are a plurality of communication connections between the vehicle and a plurality of different key devices. A key device may respectively have a digital key for authenticating the respective key device at the vehicle.

The method further comprises, on the basis of whether there is a communication connection to exactly one key device or (whether there are a plurality of communication connections) to a plurality of key devices, automatically adopting a user profile for the operation of the vehicle (without a user profile being previously selected by the user of the vehicle), or having a user of the vehicle select a user profile from a set of different user profiles (and subsequently operating the vehicle according to the selected user profile).

Another aspect describes a software (SW) program. The SW program can be configured to be executed on a processor and to thereby carry out the method described in this document.

Another aspect describes a storage medium. The storage medium may comprise an SW program that is configured to be executed on a processor and thereby to carry out the method described in this document.

It should be noted that the methods, apparatuses and systems described in this document may be used both on their own and in combination with other methods, apparatuses and systems described in this document. Furthermore, any aspects of the methods, apparatuses and systems described in this document may be combined with one another in a wide variety of ways. The features of the claims may in particular be combined with one another in a wide variety of ways. Furthermore, features in parentheses are to be understood as optional features.

The invention is described in more detail below with reference to exemplary embodiments.

Other objects, advantages and novel features of the present invention will become apparent from the following detailed description of one or more preferred embodiments when considered in conjunction with the accompanying drawings.

DETAILED DESCRIPTION OF THE DRAWINGS

As stated at the outset, the present document deals with the convenient use of a vehicle, in particular with regard to the definition of user-specific settings of one or more vehicle components (such as a vehicle seat, an air conditioning system, a seat heating system, an infotainment system, etc.), by a plurality of users.

Figure 1A:
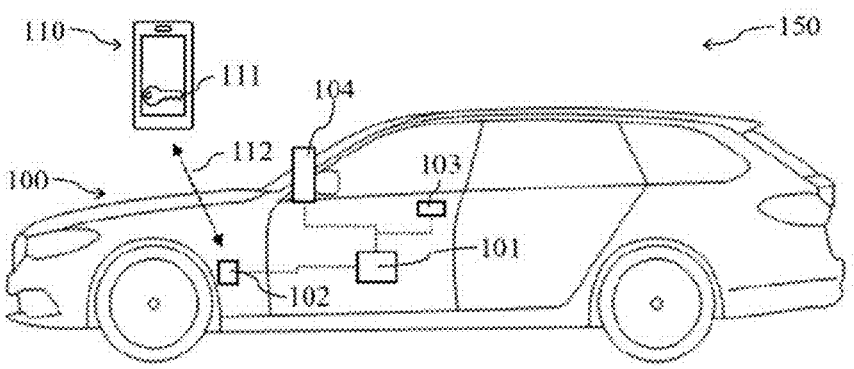
FIG. 1a shows an exemplary digital access system of a vehicle.

FIG. 1a shows an exemplary (access) system 150 which comprises at least one vehicle 100 and a digital key device 110. The digital key device 110 is typically a portable electronic device, such as for example a smartphone or a tablet PC, wherein a digital key 111 is stored on the portable electronic device. The digital key 111 may be stored in a protected memory area, in particular in a so-called "secure element", of the portable electronic device (such as the user device).

The digital key device 110 is designed to communicate with a communication unit 102 of the vehicle 100 over one or more different wireless communication connections 112. The different communication connections 112 may be used for different purposes. In particular, a Bluetooth Low Energy (BLE) communication connection 112 may be used to determine the distance and/or relative position between the digital key device 110 and the vehicle 100 (in particular on the basis of the signal strength, in particular the RSSI (Received Signal Strength Indicator), of the radio signals interchanged between the vehicle 100 and the device 110; and/or using BLE channel sounding (mode 2/phase-based measurements)); and/or interchange data between the digital key device 110 and the vehicle 100 (for example a control command for controlling a vehicle function 103, such as the unlocking of a door and/or the opening or closing of a window and/or the activation or deactivation of a heating function and/or the activation or deactivation of the drive motor of the vehicle 100).

As an alternative or in addition, an ultra-wideband (UWB) communication connection 112 may be used to determine the position of the device 110 relative to the vehicle 100 with a relatively high degree of accuracy. Determining the position of the device 110 using the UWB communication connection 112 may be referred to as UWB ranging.

Figure 1B:
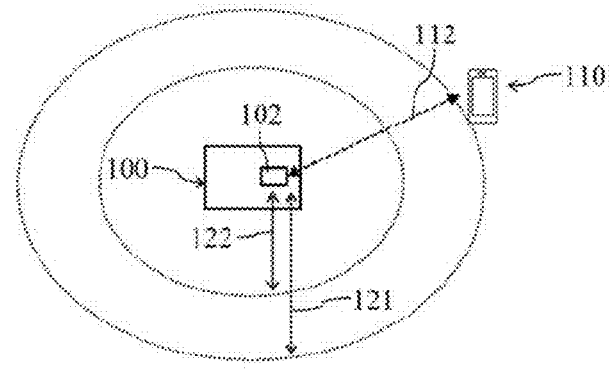
FIG. 1b shows an exemplary usage situation for a digital access system.

A (control) apparatus 101 of the vehicle 100 may be designed to control at least one vehicle function 103 of the vehicle 100 on the basis of the communication between the device 110 and the vehicle 100, as illustrated in FIG. 1*b* for example. In this context, the digital key 111 of the device 110 may be verified, in particular authenticated. Furthermore, after successful authentication, one or more vehicle functions 103 can be controlled, in particular on the basis of the distance between the device 110 and the vehicle 100;

the position of the device 110 relative to the vehicle 100; and/or a control command that is sent from the device 110 to the vehicle 100 over a communication connection 112.

In an exemplary system 150, a BLE communication connection 112 may be established between the device 110 and the vehicle 100 as soon as the distance between the device 110 and the vehicle 100 is equal to or less than a first distance threshold value 121. This allows the user to remotely control one or more vehicle functions 103 using the device 110. Typically, the vehicle 100 indicates the availability of a BLE communication connection 112 repeatedly, for example at a certain frequency. From the first distance threshold value 121, the device 110 (which may also be referred to as "user equipment" (UE)) receives the indication message from the vehicle 100 and the BLE communication connection 112 may then be established between the device 110 and the vehicle 100. The first distance threshold value 121 may depend on the communication capabilities of the device 110, the environment of the vehicle 100 and/or of the device 110, and/or the position of the device 110 relative to the vehicle 100.

Furthermore, a UWB communication connection 112 may be established between the device 110 and the vehicle 100 as soon as the distance between the device 110 and the vehicle 100 is equal to or less than a second distance threshold value 122 (which may be less than the first distance threshold value 121 and/or which may depend on the communication capabilities of the device 110). Based on the UWB communication connection 112, the location of the device 110 may be determined with a relatively high degree of accuracy. One or more additional vehicle functions 103 can possibly be controlled via the UWB communication connection 112 (in addition to the one or more functions 103 which can be controlled via the BLE communication connection 112).

Figure 2:
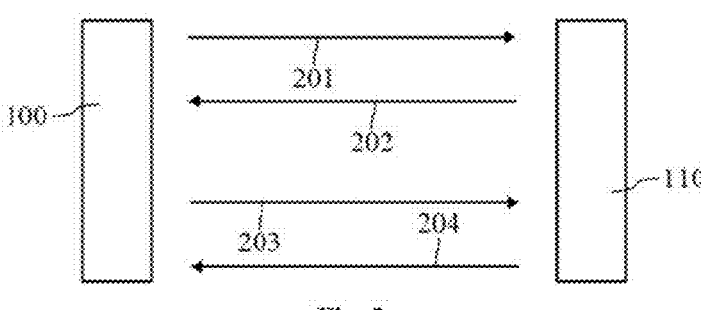
FIG. 2 shows exemplary messages between a vehicle and a digital key device.

FIG. 2 illustrates the (possibly repeated, in particular periodic) sending of an indication message 201 by the vehicle 100 in order to indicate that a (BLE) communication connection 112 to the vehicle 100 can be set up. FIG. 2 further shows a response message 202 which is sent from the device 110 to the vehicle 100 in response to the receipt of an indication message 201 in order to set up the communication connection 112. Following the setup of the (BLE) communication connection 112, messages 203, 204 can be interchanged between the vehicle 100 and the device 110 via the communication connection 112, e.g. in order to remotely control a vehicle function 103.

Figure 3:
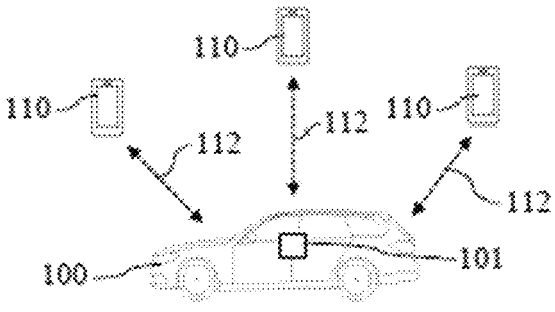
FIG. 3 shows an exemplary situation in which a plurality of key devices are arranged in the surroundings of the vehicle.

A vehicle 100 can be operated with a plurality of key devices 110, e.g. in order to enable different users in a family or in a company to use the vehicle 100. The vehicle 100, in particular the (control) apparatus 101 of the vehicle 100, may be designed to determine whether one or more key devices 110 are approaching the vehicle 100 and/or are arranged in the surroundings of the vehicle 100 or in the vehicle 100. It can be determined in particular (as illustrated in FIG. 3 for example) whether there is a communication connection 112 to a key device 110 or to a plurality of key devices 110. The vehicle 100 can then be operated on the basis of whether there is a communication connection 112 to one or more key devices 110 (i.e. whether there is exactly one communication connection 112 to exactly one key device 110 or whether there are a plurality of communication connections 112 to a plurality of key devices 110). The vehicle 100 can be operated in particular on the basis of the number of key devices 110, to each of which there is a (respectively dedicated) communication connection 112.

For example, one or more vehicle seats of the vehicle 100 can be adjusted automatically on the basis of whether there is a respective communication connection 112 to one or more key devices 110. For example, only the driver's seat can be adjusted if it is recognized that there is a communication connection 112 only to one key device 110. On the other hand, the driver's seat and the front passenger's seat can be adjusted if it is recognized that there is a (dedicated) communication connection 112 to exactly two key devices 110 in each case. In this case, the front passenger's seat can be adjusted, for which it is assumed that no occupant is seated on the one or more rear seats of the vehicle 100. For example, in this case, the front passenger's seat can be moved relatively far back. If it is recognized that there is a (dedicated) communication connection 112 to three or more key devices 110 in each case, the front and/or rear seats can be adjusted assuming that both one or more front seats and one or more rear seats will be occupied.

Thus, a distinction for the preparation of the vehicle 100 can be made on the basis of whether a person with a digital key 111 is approaching the vehicle 100 or whether a plurality of persons each with a digital key 111 are approaching the vehicle 100. For this purpose, the vehicle 100, in particular the (control) apparatus 101 of the vehicle 100, may be designed to recognize by means of the UWB and/or BLE communication how many active devices 110 are approaching the vehicle 100. Based on this, it is possible to predict how many persons will enter the vehicle 100.

For example, if more than two persons are approaching the vehicle 100, one or more of the front seats can be moved forward so that the one or more persons entering at the rear have enough space on the one or more rear seats.

Alternatively or additionally, integration of a key device 110 into the infotainment system of the vehicle 100 may depend on whether there is a communication connection 112 to one or more key devices 110. For example, the extent of the integration of a telephone function of a first key device 110 may depend on whether or not, in addition, there is in each case a further communication connection 112 to one or more further key devices 110. If there are one or more further communication connections 112 to one or more further key devices 110, it is possible, for example, for a call for the first key device 110, which is connected to the vehicle 100, to not be indicated in the vehicle 100 (e.g. muted). On the other hand, a call for the first key device 110 can be indicated in the vehicle 100 (e.g. on a screen of the vehicle 100) if there is no communication connection 112 to one or more further key devices 110.

It can thus be determined whether there is in each case a (dedicated) communication connection 112, in particular an authenticated communication connection 112, (either) to exactly one key device 110 or to a plurality of key devices 110. The individual key devices 110 may each have a digital key 111 for authenticating the respective key device 110 at the vehicle 100. An authenticated communication connection 112 to a key device 110 may only be set up after the key device 110 has been successfully authenticated using the digital key 111 of the key device 110. The existence of an authenticated communication connection 112 may allow the respective key device 110 to (remotely) control one or more functions 103 of the vehicle 100 via this communication connection 112.

The vehicle 100, in particular at least one function 103 of the vehicle 100, can then be operated on the basis of whether there is an (authenticated) communication connection 112 to exactly one key device 110 or whether (alternatively) there are (authenticated) communication connections 112 to a plurality of key devices 110.

The operation of one or more functions 103 of the vehicle 100 may be defined by a user profile for a user of the vehicle 100. For example, the user profile can define one or more user-specific settings of a vehicle seat;

one or more user-specific settings of vehicle illumination;

one or more user-specific settings of an air conditioning system; and/or one or more user-specific settings of an infotainment system (e.g. in relation to a playlist or in relation to a selection of radio stations).

Different user profiles can be defined for different users. The different user profiles can be associated with different digital keys 111 and/or with different key devices 110.

If it is recognized that there is a communication connection 112 to exactly one single key device 110, the user profile associated with this key device 110 can be used automatically (without interaction with the user of the vehicle 100). The vehicle 100 can then be automatically configured for a journey according to the automatically selected user profile.

If it is recognized that there are communication connections 112 to a plurality of different key devices 110, the different user profiles associated with the different key devices 110 can be determined. For example, it can be recognized that there is a communication connection 112 to N different key devices 110 in each case, with N>1. (Up to or exactly) N different user profiles can then be determined.

Furthermore, it is possible for the list of (up to N or exactly N) user profiles to be output for selection, e.g. via the user interface 104 of the vehicle 100 (e.g. on a screen). A user of the vehicle 100 can then select the user profile to be used for the operation of the vehicle 100. Following the selection of a user profile, the vehicle 100 can be operated with the user profile selected (by the user).

As described further above, the position of the individual key devices 110 can be determined on the basis of the communication connections 112, in particular on the basis of the UWB communication connections. In particular, the distance between the individual key devices 110 and a reference position, e.g. the driver's position, of the vehicle 100 can be determined. The list of user profiles can then be sorted and output on the basis of the position of the corresponding key devices 110. In particular, the user profiles can be sorted according to the increasing distance between the corresponding key devices 110 and the reference position (with the result that the user profile associated with the key device 110 closest to the reference position is listed as the first user profile in the list, etc., with increasing distance). The convenience of manually selecting a user profile can be further increased by sorting the list of user profiles based on their position.

Figure 4:
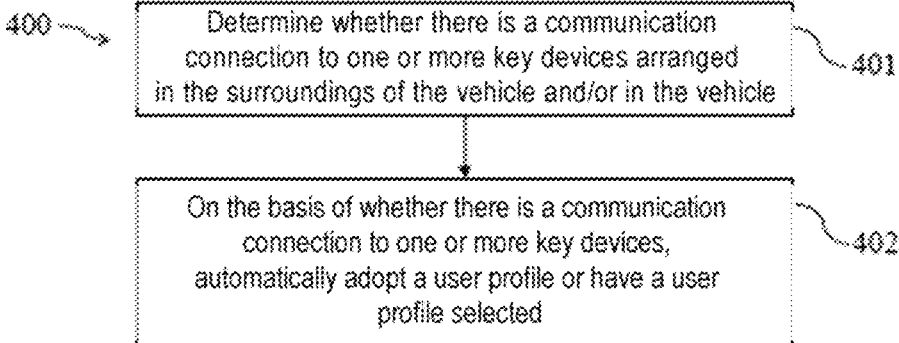
FIG. 4 shows a flowchart of an exemplary method for operating a vehicle on the basis of a user profile.

FIG. 4 shows an exemplary (possibly computer-implemented) method 400 for selecting a user profile for operating a (motor) vehicle 100. The method 400 can be carried out by a control apparatus 101 of the vehicle 100.

The method 400 comprises determining 401 whether there is a communication connection 112, in particular an authenticated communication connection 112, to exactly one key device 110 or to a plurality of key devices 110.

Furthermore, the method 400 comprises, on the basis of whether there is a communication connection 112 to exactly one key device 110 or to a plurality of key devices 110, effecting 402 automatic adoption of a user profile for the operation of the vehicle 100 (if there is a communication connection 112 to exactly one key device 110), or having 402 a user of the vehicle 100 select a user profile from a set of different user profiles (if there is a communication connection 112 to a plurality of key devices 110).

The measures described in this document can ensure that a vehicle is used in a particularly convenient manner by a plurality of users.

The present invention is not restricted to the exemplary embodiments that are shown. It should in particular be noted that the description and the figures are intended to illustrate the principle of the proposed methods, apparatuses and systems only by way of example.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for determining a user profile for the operation of a vehicle, the apparatus comprising:

a controller configured to:

determine that:

there is a communication connection to exactly one key device, and there are respective communication connections to a plurality of key devices, wherein each key device respectively has a digital key for authenticating the respective key device at the vehicle, based on determining there is the communication connection to exactly one key device, automatically adopt a user profile for the operation of the vehicle, and based on determining that there are respective communication connections to a plurality of key devices, have a user of the vehicle select a user profile from a set of different user profiles.

2. The apparatus of claim 1, wherein the controller is further configured to:

based on determining there are the communication connections to a plurality of key devices, determine, for the individual key devices, a respective user profile associated with the respective key device in order to determine the set of user profiles.

3. The apparatus of claim 1, wherein the controller is further configured to:

display the set of user profiles in the form of a list via a user interface, capture a selection of one of the user profiles from the list of user profiles via the user interface, and operate the vehicle with the selected user profile.

4. The apparatus of claim 1, wherein the controller is further configured to, based on determining there are the communication connections to a plurality of key devices:

determine, for the individual key devices, a respective distance between the respective key device and a reference position, in particular a driver's position, of the vehicle, and have the user of the vehicle select a user profile from the set of different user profiles, wherein the selection made depends on the distances between the individual key devices and the reference position.

5. The apparatus of claim 4, wherein the different user profiles are associated with different key devices, wherein the apparatus is configured to output, in particular display, the set of user profiles in the form of a list via a user interface, and wherein the individual user profiles within the list are sorted on the basis of the distance between the key device associated with the respective user profile and the reference position, in particular such that the user profile associated with the key device that is at the relatively shortest distance is arranged at the top of the list.

6. The apparatus of claim 1, wherein the vehicle comprises a plurality of different zones, in particular seating positions, which can each be adjusted in a user-specific manner by a user profile, and wherein the controller is further configured to:

determine position information relating to a position of the key device within the vehicle by means of the communication connection to a key device, select exactly one of the different zones on the basis of the position information, and adjust the selected zone in a user-specific manner according to a user profile associated with the key device.

7. The apparatus of claim 1, wherein a user profile comprises:

one or more user-specific settings for a vehicle seat, one or more user-specific settings for an air conditioning system and/or a seat heating system, one or more user-specific settings for an infotainment system, and/or one or more user-specific settings for illumination of the vehicle.

8. The apparatus of claim 1, wherein the controller is further configured to:

receive and verify the digital key of a key device, set up a communication connection, in particular an authenticated communication connection, to the key device when the digital key of the key device has been successfully verified, and prevent a communication connection, in particular an authenticated communication connection, to the key device when the digital key of the key device has not been successfully verified.

9. The apparatus of claim 1, wherein the communication connections to the one or more key devices each include a Bluetooth Low Energy, BLE, and/or an Ultra-wideband, UWB, communication connection, and/or wherein the digital key is designed in accordance with a Car Connectivity Consortium, CCC, key standard, in particular in accordance with CCC Release 3.

10. A method for operating a vehicle, comprising:

determining that:

there is a communication connection to exactly one key device, and there are communication connections to a plurality of key devices, wherein each key device respectively has a digital key for authenticating the respective key device at the vehicle;

based on determining that there is the communication connection to exactly one key device, automatically adopting a user profile for the operation of the vehicle; and based on determining that there are respective communication connections to a plurality of key devices, having a user of the vehicle select a user profile from a set of different user profiles.

* * * * *